Jan. 7, 1941.  E. W. BOERSTLER  2,227,422
APPLICATOR FOR USE IN TREATMENT WITH THERAPEUTIC RAYS
Filed Jan. 17, 1938
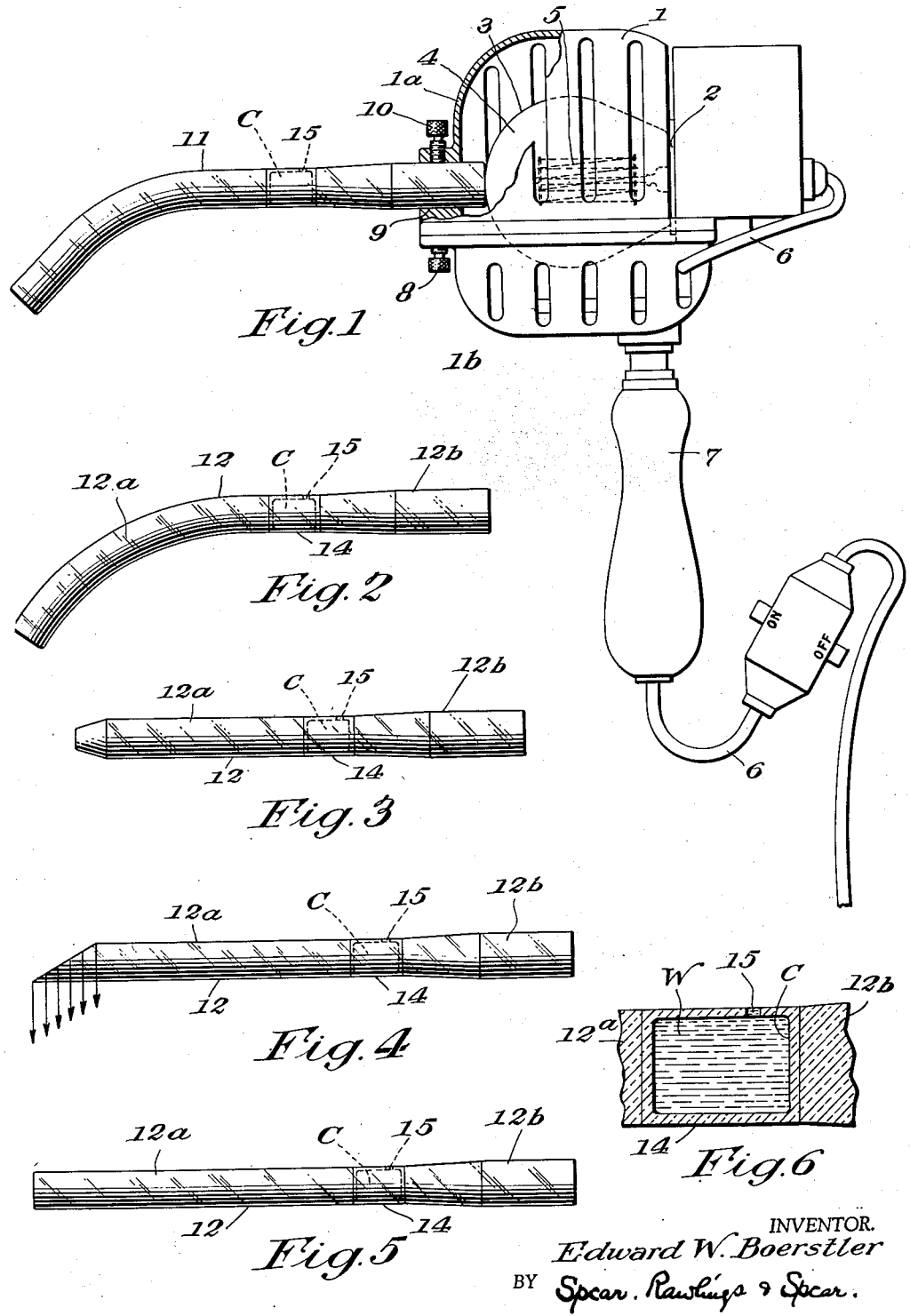
INVENTOR.
Edward W. Boerstler
BY Spear, Rawlings & Spear.
ATTORNEYS.

Patented Jan. 7, 1941

2,227,422

UNITED STATES PATENT OFFICE 2,227,422

APPLICATOR FOR USE IN TREATMENT WITH THERAPEUTIC RAYS

Edward W. Boerstler, Watertown, Mass.

Application January 17, 1938, Serial No. 185,328

6 Claims. (Cl. 128—397)

My present invention relates to novel means for the application of artificial super solar radiant energy for therapeutic treatment, particularly to living tissue and in areas which are not readily accessible to direct radiation.

I have proven by cinical experiments extending over a period of years and in widely diversified types of pathologies the therapeutic value of the radiant energy produced by those wave lengths which are capable of penetrating into appreciable depths of blood filled bodily tissues. In my work I have utilized those wave lengths which lie within the spectral region from approximately 2900 to 30,000 Angstrom units (A. U.), within which region I provide energy of an intensity of about three to three and one-half times that of solar radiation. This I am able to secure from such a source as a superheated tungsten filament lamp and have used successfully a 71 watt or even lower power lamp which I operate at a temperature of approximately 3390 K. Superheated tungsten is capable of generating a complete continuous spectrum over the full solar range from 2900 A. U. to 14,000 A. U. This range includes, however, not only the greatest number of the valuable blue, violet and longer ultra-violet rays with a maximum of luminous and near infra-red rays but certain undesirable and even dangerous high energy rays, particularly the caustic ultra-violet shorter than 2900 A. U. and the infra-red rays longer than 14,000 A. U. These do not readily penetrate bodily tissue and therefore are liable to cause severe surface burns if not removed from the administered beam.

In my prior Patent #1,800,277 I disclosed an invention involving the use of a soda-lime glass envelope or bulb for the tungsten filament which would filter out the short wave caustic ultra-violet rays of less than 2900 A. U.

It is well established that while water is transparent to the shorter infra-red rays of from 7600 A. U. to 14,000 A. U., it filters out most of the infra-red region beyond 14,000 to 80,000 A. U. The use of a water filter with the soda lime bulb therefore makes possible a maximum application of energy from 2900 to about 14,000 A. U. which represents a selectively developed group of radiations having its maximum peak in the bodily tissue penetrative wave lengths just below the visible spectrum.

It is recognized that bodily tissue, which consists largely of water, is quite transparent to the long wave visible orange and red rays and fairly transparent to near infra-red rays up to 14,000 A. U. The wave lengths of from about 5500 at 14,000 A. U. are therefore considered as within the band which penetrates body tissue with a peak at about 9500 A. U.

By referring to the comparative energy distribution curves it will be seen that at about 5500 A. U. in the visible yellow, my tungsten energy source begins to exceed solar radiation in intensity and at the filament temperature employed the energy peaks at about 9500 A. U. which coincides with the point of maximum penetration into living tissue.

While heretofore it has been established that the band of curative wave lengths might be controlled by suitable filters, a difficulty has existed in delivering the energy to certain affected parts of the body as through one of the orifices of the body, such as the mouth or nasal passages. It is well known that quartz has the property of conducting rays of light through substantially any desired angle and permitting them to emerge in a concentrated pencil at the end of the rod, but it has been difficult to filter from the quartz conductor the heat which results from the presence of the infra-red rays in the beam, and which may make the applicator so hot that it could not be used comfortably at the intensities produced by the tungsten filament lamp but which intensities are necessary to get the full complement of the full ultra-violet, visible and short wave infra-red wave-lengths which give the desired curative effects.

According to my present invention I overcome this difficulty simply and efficiently while retaining all the valuable curative rays by providing a water filter for the heat rays directly in the body of quartz which comprises the applicator.

In the drawing I have illustrated and in the following specification described several practical embodiments of my invention. In the drawing:

Fig. 1 is a side elevation of one of my novel applicators mounted in a high energy generating apparatus, Fig. 2 is a similar view of the same applicator removed from the apparatus, Figs. 3, 4 and 5 are modified forms of my applicator, and Fig. 6 is an enlarged section through the water cell of such applicator according to my invention.

The apparatus in connection with which I use my new applicator may conveniently comprise a slotted casing 1 provided with a lamp socket 2. Screwed in usual manner into the socket is a lamp 3 having a concentrated tungsten filament 5 in a soda lime glass envelope 4 which filters out the ultra-violet rays of wave lengths shorter than 2900 A. U. generated by such filament. The tungsten filament is energized from any suitable alternating or direct current source through the conductors 6 extending through the handle 7 secured to the bottom of the casing. The casing is built in two parts 1a and 1b and the lamp 3 may be readily replaced therein by removing the knurled thumbscrew 8 below the applicator receiving aperture 9 to permit the upper half of the casing 1a to be lifted so that the lamp may be unscrewed from or screwed into the socket 2.

The upper knurled thumbscrew 10 is loosened to permit the insertion or removal of an applicator 11. The applicator should be pushed in until it touches the bulb 3 before tightening the set screw 10 which then must be kept tight during treatment as expansion due to heating may occasionally cause the applicator to loosen in its socket. The applicator may be turned to any desired position for convenient use.

My applicator consists of a rod 12 of material capable of transmitting rays within the range of approximately 1800 A. U. to 40,000 A. U. In its preferred form, the rod is made entirely of fused quartz. When so made, it comprises two sections 12a and 12b of solid quartz. The section 12a is a ray emitting section and the section 12b is a ray receiving section. Between these two sections is fused a section of thin walled quartz tubing 14.

This section of tubing 14 provides a cell C having a capillary hole 15 which permits ready filling of the tube with water or other liquid and allows for expansion of the liquid but without leaking or spilling during use.

The water, indicated as W (Fig. 6), in this cell C provides a filter for the infra-red wave lengths longer than 14,000 Angstrom units. It is present in an amount which provides a thickness or depth of approximately 15 millimeters which is sufficient to provide a satisfactory filter for such wave lengths. With very thin quartz tubing, consistent with mechanical strength, no appreciable energy of longer than 14,000 A. U. will be transmitted through the applicator. The side wall portion of said cell transmits spectral portions of the incident beam of the type that are removed by the filter liquid in said cell. The ray receiving section is of sufficient extent along the path of the beam to remove from said beam a proportionate amount of heat to maintain the temperature in the filter cell below the boiling point of the liquid therein. The ray emitting section is of sufficient extent along the path of the beam to remove from said beam before delivery to the patient a proportionate amount of heat emitted from said filter cell and from the side wall portion of said cell to thereby reduce the temperature below that uncomfortable to the patient.

In cases where it may be desirable to apply predetermined values of "long-wave" infra-red energy concurrently with other spectral components such as the ultra-violet, visible or short wave infra-red radiation, this may be accomplished in a simple and effective manner by employing thicker walled tubing in the cell section. Due to the characteristic property of fused quartz of transmitting radiation, by internal reflection from its surface, such long wave infra-red energy will be dispersed evenly over the treatment area and will not be applied in a concentrated annular pattern of the cell wall.

Where the cell is integral, the surface reflection losses inherent in a supplementary cell are lessened.

The solid portions 12a and 12b of the quartz rod 12 transmit the radiant energy without appreciable loss, and hence remain cool in continuous operation. Since by the means employed the surfaces of both of these relatively large cold masses of quartz are in direct contact with the liquid in the cell, a lower temperature of the cell fluid is maintained.

My applicator may be made in any of the forms such as are suggestively shown in Figs. 2 to 5 inclusive. The applicator shown in Fig. 2 is particularly indicated in cases of tonsillar, gingival, intra-nasal, ophthalmological or dermatological treatments; the applicator of Fig. 3 is indicated in cases of catarrhal deafness, eczema and furunculosis of the auditory canal; that of Fig. 4 is indicated in cases of throat, pharyngeal, rectal and prostatic with speculum cases; and that of Fig. 5 in cases of uterine treatment.

The water cell 14 should provide between the two quartz sections 12a and 12b a water filter of a depth of at least 15 millimeters although greater than this amount is not objectionable.

The cell may be readily filled by holding the applicator under a faucet to permit the water to enter the capillary opening and rotating slightly until bubble free. The cell must be full of water when treatments are given and water lost by evaporation must be replaced. It is not necessary to plug the capillary hole as no water will be spilled in operation even with the opening directed downward.

Steam sterilization is not desirable as sediment resulting from this method will cloud the cell. Open flame heating with immediate cooling by immersion may be employed as quartz will not fracture through rapid change of temperature, or any germicidal solution may be used. It is important that the applicator be kept optically clean at all times.

The time of treatment will depend on the nature and conditions of the relief indicated as necessary at any given locus. Although I have illustrated my applicator in connection with a superheated tungsten lamp, it obviously may be used with other conventional types of lamps, as for example a mercury vapor arc lamp or a carbon arc lamp.

I claim:

1. An applicator for use with a high energy generator, consisting of three sections, the end sections being made of solid fused quartz and the intermediate section being a suitable length of quartz tubing containing a filter and fused to each end section and provided with a capillary opening to permit entry and expansion of the filtering medium.

2. An applicator for use with a generator of high radiant energy, consisting of a rod of ray transmitting material comprising a ray receiving section for attachment to the generator in the path of the beam and a ray emitting section for contact with the area to be treated and a filter cell intermediate of and attached to said ray receiving and ray emitting sections and adapted to contain a liquid ray filter, the side wall portion of said filter cell being adapted to transmit spectral portions of the incident beam of the type that are removed by the filter liquid in said cell, said ray receiving section being of sufficient extent along the path of the beam to remove from said beam a proportional amount of heat to maintain the temperature in said filter cell below the boiling point of the liquid therein, and said ray emitting section being of sufficient extent along the path of the beam to remove from said beam before delivery to a patient a proportionate amount of heat emitted from said filter cell and the side wall portion of said cell to reduce the temperature below that uncomfortable to the patient.

3. The applicator of claim 2, the ray receiving section being of fused quartz.

4. The applicator of claim 2, the ray receiving section and the ray emitting section being of fused quartz.

5. The applicator of claim 2, the filter cell being of fused quartz and being integral with said ray receiving and ray emitting sections.

6. The applicator of claim 2, the filter cell having a capillary opening to permit the cell to be filled with the filter liquid and to permit expansion of such liquid within said cell.

EDWARD W. BOERSTLER.